UNITED STATES PATENT OFFICE.

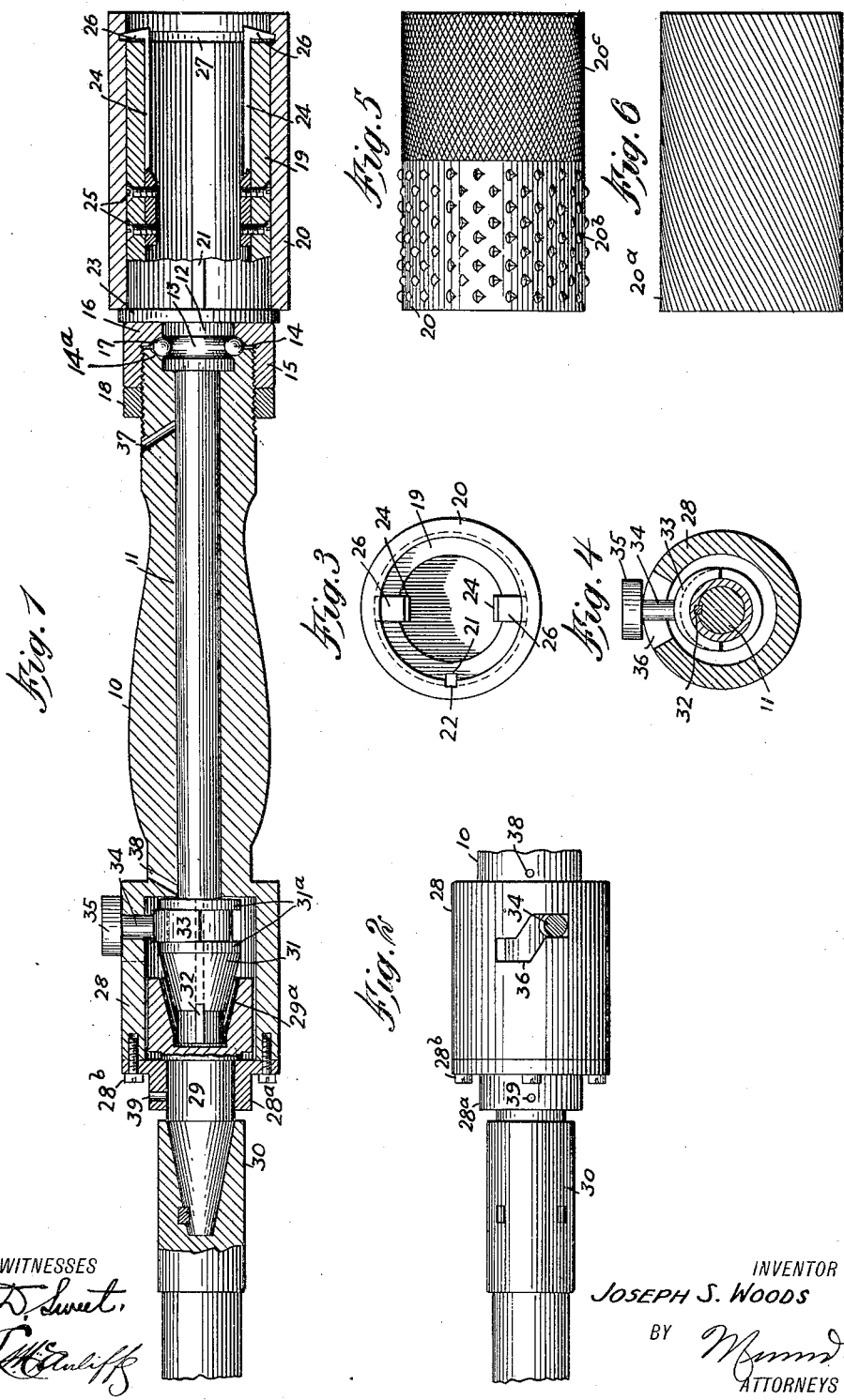

JOSEPH SUMNER WOODS, OF VALE, OREGON.

ROTARY HOOF-TRIMMER.

1,125,623.   Specification of Letters Patent.   Patented Jan. 19, 1915.

Application filed June 1, 1914. Serial No. 842,058.

*To all whom it may concern:*

Be it known that I, JOSEPH S. WOODS, a citizen of the United States, and a resident of Vale, in the county of Malheur and State of Oregon, have invented a new and Improved Rotary Hoof-Trimmer, of which the following is a full, clear, and exact description.

My invention relates to a revolubly driven tool for use in farriery, in trimming hoofs, the tool comprising a spindle to carry the trimming tool or tools, and means for establishing a driving connection between the spindle and a flexible shaft of rotary drive means.

Objects of the invention are to provide an improved means for establishing connection with the drive shaft; to provide for interchangeably securing various tools to the spindle; to provide improved bearings and thorough lubrication, and to generally improve devices of the indicated character with a view to promote strength and efficiency as well as simplicity of adjustment and control.

The invention will be particularly explained in the specific description following.

Reference is to be had to the accompanying drawings forming a part of this specification, in which similar characters of reference indicate corresponding parts in all the views.

Figure 1 is a longitudinal sectional elevation of a trimming tool embodying my invention; Fig. 2 is a fragmentary side elevation of the rear portion of the tool, indicating the manner of manually shifting the clutch for the drive to make or break the driving connection with the spindle; Fig. 3 is a front end view; Fig. 4 is a cross section through the tool, near the rear end, showing the clutch-actuating means; and Figs. 5 and 6 are side elevations of tools which may be interchangeably employed with advantage.

In constructing a practical embodiment of my invention as illustrated, a tubular body 10 is provided with a central bore in which a spindle 11 is adapted to turn. To effect a bearing for the spindle at one end and enlargement or collar 12 is formed thereon, having a ball groove 13 for receiving bearing balls 14. A nut 15 on the body 10 has an annular inwardly projecting flange 16 defining a bore of less diameter than the body of the nut formed with a cone bearing 17 adjacent to the annular groove 13. An opposed cone bearing $14^a$ is produced on the end of the tubular body 10 and forms with the core 17 and groove 13 a ball race for the balls 14. A lock nut 18 on the body at the inner end of the cone nut 15, serves to lock the latter. On the spindle 11 is formed a tubular head 19 adapted to slidably receive on its exterior a tubular tool 20, or $20^a$, hereinafter referred to. A tongue and groove connection is established between the head 19 and the tool 20, there being shown in the present example, a key 21 on the exterior of the head 19, and a corresponding keyway 22 in the tool 20 at the interior. It will be obvious that the key and keyway may be reversed, but it will be more economical to produce the keyway in the tool, since when the latter is worn out and discarded, the keyway in the discarded tool will represent less expense than would a key.

The inward movement of the tubular tool 20 is limited by a flange 23 on the spindle at the base of the head 19 adjacent to the cone nut 15. In order to positively retain the tubular tool 20 in position on the head 19, the latter is provided with spring latches 24 in the form of plate springs secured as by screws 25 or the like, to the said head, at the interior of the latter. The latches 24 have latch heads 26 disposed in an outward radial direction, adapted to engage a corresponding formation on the tool 20 at the interior. I have shown an annular groove 27 to receive the heads 26, since the groove may be produced with facility and will present the necessary depressions at diametrically opposite points to receive the latch heads 26.

The described arrangement of the tongue and groove connection, and the latching means on the tubular head and tubular tool permit of the convenient and quick interchange of tools of different character. In Fig. 5 the tool is shown with a zone $20^b$ in the form of a coarse rasp and a zone $20^c$ at the opposite end in the form of a finer rasp. In Fig. 6 is illustrated a tubular tool $20^a$ having an exterior peripheral working face corresponding with a mill file. The working faces of the tubular tools may be variously formed to correspond with different rasps and files, and the substitution of one tool for another may be quickly effected, whereby to employ the tools in succession.

At the end opposite the head 19 the tubular body 10 is enlarged to form a cylindrical housing 28, having a front cap 28ª which may be detachably secured by screws 28ᵇ. Extending into the housing 28 through the cap 28ª is a drive element 29, which is secured to a drive shaft 30, which may be driven in any suitable manner. The shaft 30 in practice, preferably will be a flexible shaft. The drive element 29 is formed at its inner end within the housing 28 with a friction clutch element 29ª. A mating friction clutch element 31 is slidably fitted on the adjacent end of the spindle 11 within the housing 28, the slidable clutch element engaging a rib or feather 32 on the said spindle. To manually shift the sliding clutch element 32 to make or break the driving connection between the spindle and the drive element 29, a clutch fork or shoe 33 is received between flanges 31ª on the sliding clutch, and has a stem 34 extending laterally through the exterior of the housing 28 and provided with a head 35 for convenient movement of the clutch fork. The shank 34 extends through a slot 36 in the housing 28, said slot presenting end members parallel with each other and an oblique intermediate connecting member, as clearly shown in Fig. 2. The form of the slot permits a movement of the shank 34 and clutch fork 33 longitudinally of the spindle, while giving also a lateral movement to position the shank 34 in either of the parallel ends of the slot 36, and prevents accidental axial displacement of the sliding clutch member.

To lubricate the spindle 11 an oil hole 37 is formed in the body 10 near the front end, and an oil hole 38 in said body near the opposite end. A third oil hole 39 may be provided in the cap 28ª in the housing 28, to lubricate the drive element 29 which has a bearing in said cap.

By the described construction the operation of properly trimming a hoof may be performed expeditiously and with convenience, and without the necessity of employing the usual horse rasp and hoof nippers. The provision of the different rasp surfaces on the exterior of the single rotary tool permits of the most efficient use of these surfaces in succession, and a finishing tool such as 20ª may be quickly substituted for the tubular rasp if required. The clutch means and bearings provided for the revoluble parts also promote convenience and efficiency in the use of the tool.

Having thus described my invention, I claim as new, and desire to secure by Letters Patent:

1. In a device of the character described, a tubular body, a spindle revolubly mounted in the body, means for establishing connection between the spindle and actuating means, a tubular head on the spindle at one end, a tubular tool removably fitting said head and having an exterior peripheral working surface, and co-acting fastening elements on the head and on the interior of the tubular tool, said tool having an open front end affording access to the said fastening elements.

2. In a device of the character described, a spindle, means to connect the spindle with the drive means, a tubular head on the spindle, a tubular tool slidably fitting said head exteriorly, the said head and tool having a tongue and groove connection, and a longitudinally ranging spring latch secured to said head on the interior thereof and detachably engaging the tubular tool.

3. In a device of the character described, a revoluble spindle, means to connect the spindle with the drive means, the said spindle having a tubular head, a tubular tool slidable on the tubular head exteriorly, and a longitudinally ranging spring latch secured to said head at the interior thereof and detachably engaging the interior of the tubular tool.

4. In a device of the character described, a tubular body enlarged at one end to form a housing, a drive element extending into said housing and provided therein with a clutch member, a spindle terminating at one end in the housing co-axial with the drive element, means at the opposite end of the spindle to support a tool, a clutch member slidable on the spindle within the housing to engage and disengage the clutch member on the drive element, a laterally projecting operating device on the said slidable clutch member, the said housing having a slot presenting end members approximately parallel, and an intermediate, oblique member connecting the end members of the slot, the clutch-operating device extending outward to the said slot.

5. In a device of the character described, a tubular body having a housing at one end, a spindle revoluble in said body, the spindle extending at one end into the said housing and having means at the opposite end to carry a tool, a drive element extending into the housing oppositely to and coaxial with the spindle, the said drive element having a clutch member, a slidable clutch member on the spindle, and a laterally projecting device on the slidable clutch member, said device extending laterally through the housing and being movable relatively to the latter to engage or disengage the clutch member.

6. In a device of the character described, a tubular body; a spindle revoluble therein and formed at its front end with a head to receive a tool as well as a flange adjacent to said head and a ball groove adjacent to the flange; a nut on the body having a flange between the ball groove and the flange of the spindle, said flange of the nut defining a bore of less diameter than the body of the nut, there being an opposed cone on the forward end of the body, said cones co-acting with the said groove to form a ball race; and a lock nut for the cone nut, at the inner end of the latter.

In testimony whereof I have signed my name to this specification in the presence of two subscribing witnesses.

JOSEPH SUMNER WOODS.

Witnesses:
FRANK HIGH,
R. M. DUNCAN.

Copies of this patent may be obtained for five cents each, by addressing the "Commissioner of Patents, Washington, D. C."